United States Patent
Susumago

(10) Patent No.: US 8,146,114 B2
(45) Date of Patent: Mar. 27, 2012

(54) DISK PLAYBACK DEVICE INCLUDING A FUNCTION OF LOCKING AND UNLOCKING A VIBRATION INSULATING MECHANISM

(75) Inventor: Yuki Susumago, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 12/810,203

(22) PCT Filed: Dec. 22, 2008

(86) PCT No.: PCT/JP2008/003892
§ 371 (c)(1),
(2), (4) Date: Jun. 23, 2010

(87) PCT Pub. No.: WO2009/090716
PCT Pub. Date: Jul. 23, 2009

(65) Prior Publication Data
US 2010/0287575 A1 Nov. 11, 2010

(30) Foreign Application Priority Data
Jan. 17, 2008 (JP) .................. 2008-008206

(51) Int. Cl.
*G11B 33/14* (2006.01)
*G11B 33/08* (2006.01)
*G11B 17/03* (2006.01)

(52) U.S. Cl. ....................................... 720/651; 720/639
(58) Field of Classification Search .......... 720/619–623, 720/639, 641, 642, 651
See application file for complete search history.

(56) References Cited

U.S. PATENT DOCUMENTS

| 6,655,232 | B2 | 12/2003 | Fujikawa et al. |
| 6,826,765 | B2 | 11/2004 | Takai et al. |
| 2004/0022160 | A1 | 2/2004 | Takai et al. |

FOREIGN PATENT DOCUMENTS

| JP | 2000-339877 A | 12/2000 |
| JP | 2002-175658 A | 6/2002 |
| JP | 2002-329359 A | 11/2002 |
| JP | 2003-123362 A | 4/2003 |
| JP | 2007-73162 A | 3/2007 |

*Primary Examiner* — Craig A. Renner
*Assistant Examiner* — Gustavo Polo
(74) *Attorney, Agent, or Firm* — Birch, Stewart, Kolasch & Birch, LLP

(57) ABSTRACT

The present invention relates to a vehicle-mounted disk playback device, and more particularly to a disk playback device having the function of locking and unlocking a vibration insulating mechanism of a playback deck. According to the present invention, the disk playback device can transmit a conveyance force of the disk to a lock member to cause the member to unlock the playback deck by arranging a lever member, a clamp member, and an urging member with a specific feature.

2 Claims, 5 Drawing Sheets

DISK PLAYBACK DEVICE INCLUDING A FUNCTION OF LOCKING AND UNLOCKING A VIBRATION INSULATING MECHANISM

TECHNICAL FIELD

The present invention relates to a vehicle-mounted disk playback device, and more particularly to a disk playback device having the function of locking and unlocking a vibration insulating mechanism of a playback deck.

BACKGROUND ART

In recent years, employed in a vehicle-mounted disk playback device for playing back an optical disk (hereinafter, referred to as a "disk") such as a CD or a DVD is a slot-in system without a tray for loading and unloading a disk, such that the disk is directly inserted or loaded in a slit opening in order to be adapted to a narrow installation space. In the method, when a disk is inserted therein through a slit opening, the outer edge of the disk is detected at a previously determined position at which the disk is loaded to rotate a carrier roller, the disk is held between the carrier roller and a disk guide to be carried to a playback position where a turntable is located, the disk is then disengaged from the carrier roller and the disk guide, and is clamped against the turntable by a clamper descending from above.

Meantime, the disk playback device includes a variety of auxiliary mechanisms in addition to the mechanisms for performing the above-described main operations. Particularly, in the case of a vehicle-mounted disk playback device vulnerable to vibrations from the external, a vibration insulating mechanism is provided on a playback deck where a travel mechanism of an optical pickup is assembled. The vibration insulating mechanism has a structure for creating a floating state in which the playback deck is supported by a chassis base with a dumper or the like to insulate the vibrations. The playback deck is locked by a lock member during non-use and during disk carrying operation for loading and unloading the disk, while the playback deck is released from the lock by the lock member to be placed in a floating state during playback.

The outline of the operation of the disk playback device from the disk loading to the playback start including the lock operation and the unlock operation of the playback deck will be explained with the internal structure of the disk playback device shown in FIG. 9.

A disk (not shown) loaded in the disk playback device is gripped between a rotating carrier roller 1 and a disk guide (not shown) located above the carrier roller to be carried until the central hole of the disk is positioned above a turntable 7. At this moment, a lever member 2 abutting against the outer periphery of the disk is counterclockwise rotated by the conveyance force of the disk, and a tip portion of the lever member 2 moves a lock member 3 toward the front side of the device. By this movement, the lock member 3 is linearly displaced by a rack section engaging with a gear of a gear unit 8 rotated by a motor 10.

A clamp member 4, which is located above the turntable 7 and engaged with the lock member 3, begins to descend by the movement of the lock member 3 to cause a clamper 5 attached on the clamp member 4 to abut against the top face of the disk. Further, in order to carry the disk, the carrier roller 1, which is normally urged to the side of the disk guide located above the roller by a spring force, begins to descend to thus move away from the disk guide, when the inclined end of the lock member 3 abuts against the carrier roller by the movement of the lock member 3. At this time, the disk is held by an urging force of the descending clamper 5 from the top and an urging force of the carrier roller 1 from below, is lowered as the carrier roller 1 lowers, and is clamped against the turntable 7 on the playback deck 6.

The lock member 3 moves furthermore even after the disk clamps against the turntable 7; thus, another lock member 16 also begins to move, and the playback deck 6 is unlocked to go to a floating state. When the playback deck 6 is unlocked, a spindle motor is driven to rotate the disk clamped against the turntable 7, and an optical pickup 11 reads a record surface of the disk while moving radially of the disk.

The lock operation and the unlock operation of the playback deck carried out by the lock member are performed in synchronization with the disk carrying operation during loading or unloading of the disk, and thus the lock and the unlock operations thereof use the conveyance force of the disk. The lever member for transmitting the conveyance force of the disk to the lock member is rotated or translated by abutting against the outer periphery of the disk to be carried, and then is fixed at a position remote from the disk by a fixing member provided separately, while the disk is rotated and played back with being clamped against the turntable.

In this connection, Patent Document 1 discloses an example of a lever member for transmitting the conveyance force of a disk to a lock member in order to unlock a playback deck; however, the mechanism using a switching lever disclosed in Patent Document 1 is different from that of the present invention in the operating structure.

Patent Document 1: JP-A-2003-123362

In a lever member for transmitting the conveyance force of a disk to a lock member of a playback deck, as described above, in order to prevent the backlash of the lever member created by vibrations from the external, it is necessary to separately add thereto a means such as an urging member for normally urging the lever member. Therefore, the number of components increases, thus making it difficult to reduce the thickness of the product. Further, when the conveyance force of the disk to be carried is power-transmitted to the lock member, it is required to provide a mechanism such that the lever member can be operated by a small force without hindering the conveyance force of the disk.

In order to solve the above-mentioned problems, the present invention has been made, and an object of the present invention is to provide a disk playback device which makes it possible to reduce the thickness thereof by reducing the number of components of means for eliminating the backlash caused by external vibrations in a mechanism for transmitting the conveyance force of a disk and unlocking a playback deck.

DISCLOSURE OF THE INVENTION

The disk playback device according to the present invention, is arranged such that a clamp member has a boss shaft and a pin provided at different positions on a face thereof opposed to a turntable; a lever member is formed of a flat plate, and has a disk-detecting end against which the outer periphery of a carried disk abuts, a tip portion located on the side opposite from a disk-detecting end and abutting against a lock member, an arcuate hole located on the disk-detecting end side thereof, receiving the pin inserted therein, and having a cutaway groove positioned at the inner peripheral edge of the large diameter side thereof, and a long hole located on the tip portion side thereof, receiving the boss shaft inserted therein, and extending in a direction radial to the arcuate hole; the disk playback device includes an urging member for generating an urging force substantially parallel to the long hole to rotate the lever member about the boss shaft as a fulcrum in the opposite direction to a carrying direction of the disk; and the lever member is, when the lever member has the conveyance force of the disk having abutted against the disk-detecting end exerted thereon, rotated in the carrying direction of the disk against the urging force of the urging member, thereby the tip portion moves the lock member in the direction in which the lock by the lock member is released, the lever member is, when the lock member is moved off the tip portion before long, guided by the boss shaft inserted in the long hole to be moved by the urging force of the urging member, thereby the disk-detecting end is moved off the disk clamped against the turntable, and also the pin fits into the cutaway groove of the arcuate hole to position the lever member.

According to the present invention, by simply arranging a structure in which the lever member, the clamp member, and the urging member to be all fundamentally used are combined with a specific feature, the disk playback device can transmit the conveyance force of the disk to the lock member to cause the member to unlock the playback deck, and can determine, in addition thereto, the position (fixation) of the lever member during playback. As a result, there is not required the separate provision of dedicated members for preventing the backlash of the lever member caused by vibrations from the external. Thus, reduction in the thickness of the device can be achieved without increasing the number of components. Furthermore, a mechanism can be achieved such that the lever member is operated by a small force without interfering with the conveyance force of a disk when the conveyance force of the disk to be carried is power-transmitted to the lock member.

BEST MODE FOR CARRYING OUT THE INVENTION

Embodiments of the present invention will now be described with reference to the accompanying drawings in order to explain the present invention in more detail.

First Embodiment

Figure 1:
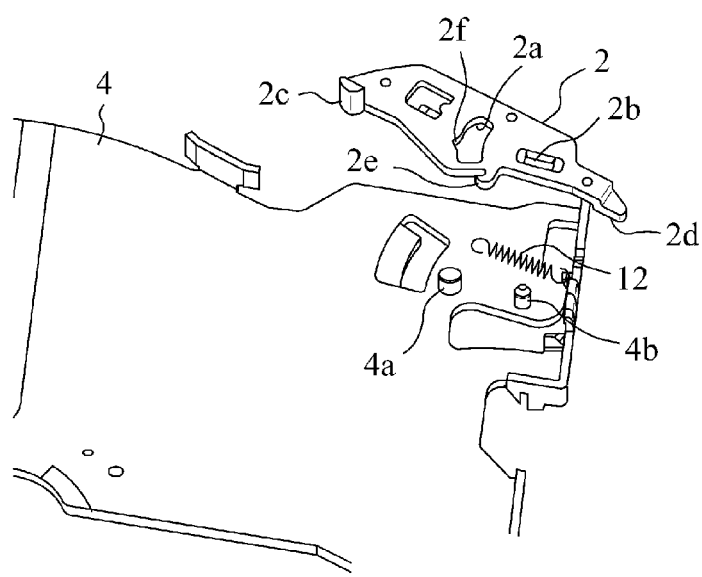
FIG. 1 is an exploded perspective view showing a clamp member and a lever member applied to a disk playback device in accordance with a first embodiment of the present invention.
Figure 2:
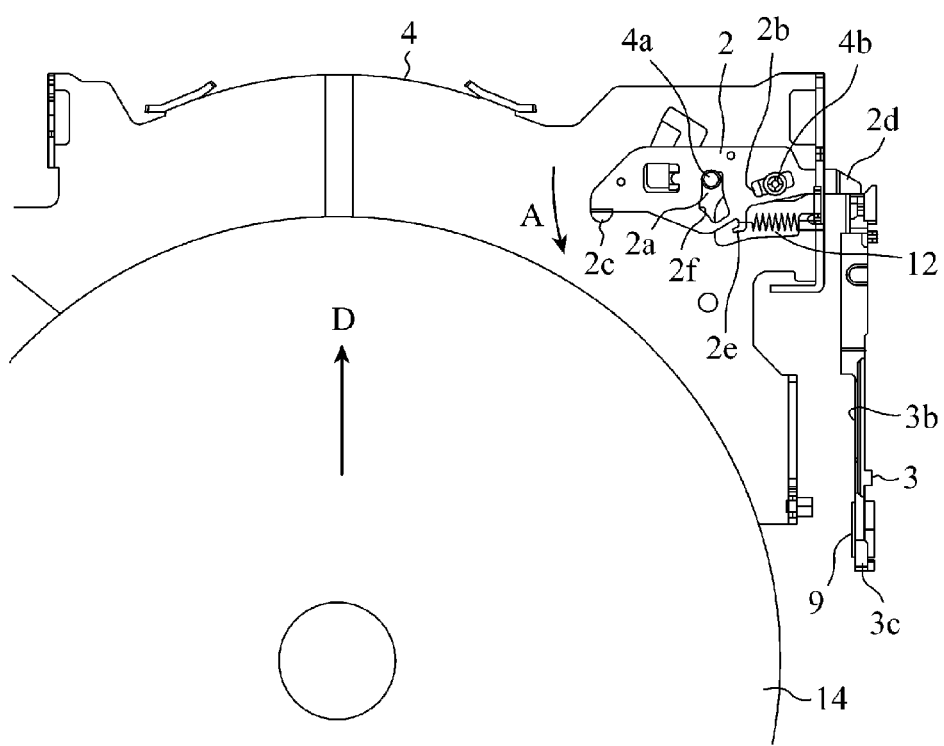
FIG. 2 is an explanatory view showing a working state of the disk playback device in accordance with the first embodiment of the present invention.
Figure 4:
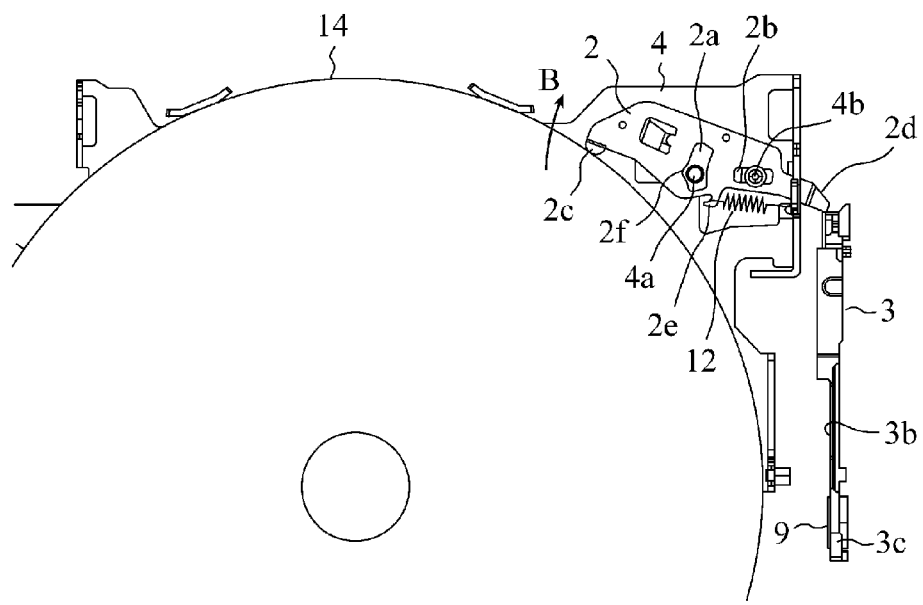
FIG. 4 is an explanatory view showing another working state of the disk playback device in accordance with the first embodiment of the present invention.
Figure 6:
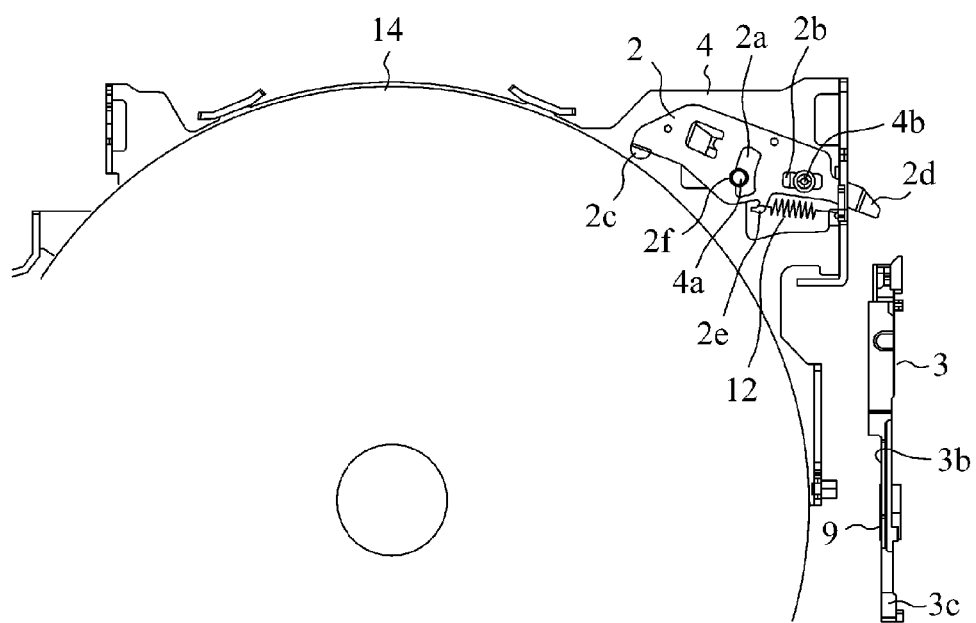
FIG. 6 is an explanatory view showing yet another working state of the disk playback device in accordance with the first embodiment of the present invention.

FIG. 1 is an exploded perspective view showing a clamp member and a lever member used in a disk playback device in accordance with a first embodiment of the present invention. FIG. 2, FIG. 4, and FIG. 6 each correspond to a partial structure of a disk playback device of the present invention from the back side of the aforementioned clamp member 4 shown in FIG. 9, and show a working state of a lock member corresponding to a positional state of a disk. It is noted that a turntable is located above the space of FIG. 2, FIG. 4, and FIG. 6. FIG. 2 shows a state before the outer periphery of a disk 14 abuts against the lever member 2 upon carrying the disk. FIG. 4 shows a state in which the outer periphery of the disk 14 in the course of being carried is abutting against the lever member 2. FIG. 6 shows a state in which the lock member 3 is away from the lever member 2.

Figure 3:
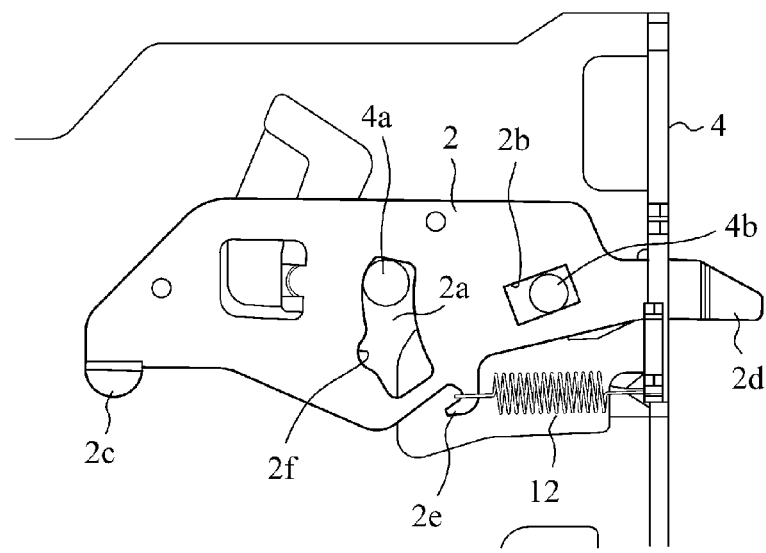
FIG. 3 is an enlarged view showing a lever member in the state shown in FIG. 2.
Figure 5:
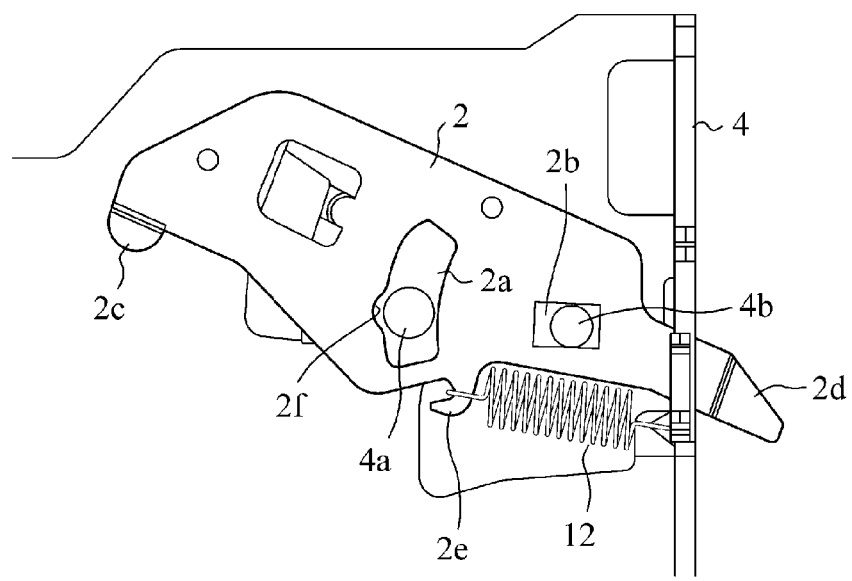
FIG. 5 is an enlarged view showing the lever member in the state shown in FIG. 4.
Figure 7:
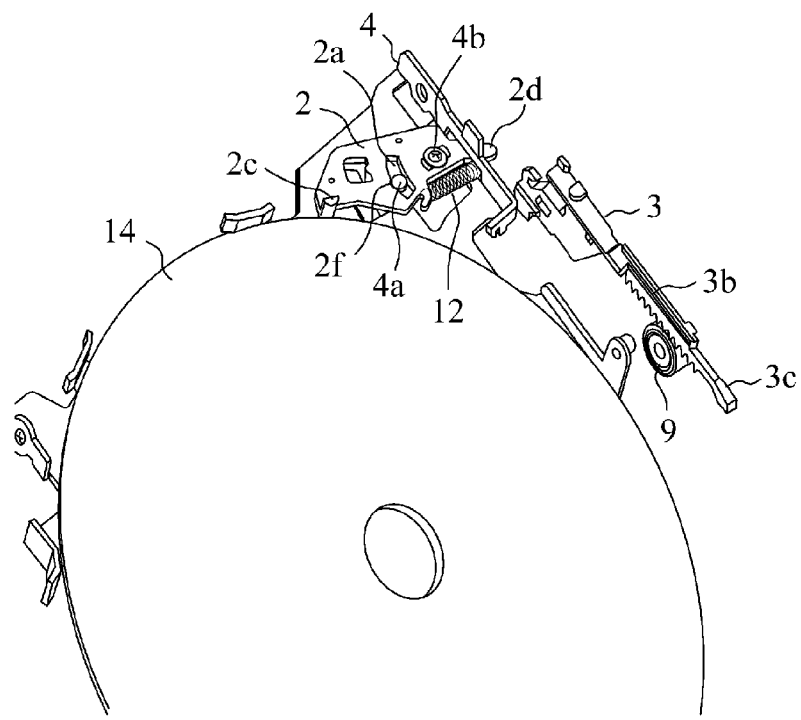
FIG. 7 is a perspective view showing the state shown in FIG. 6.
Figure 8:
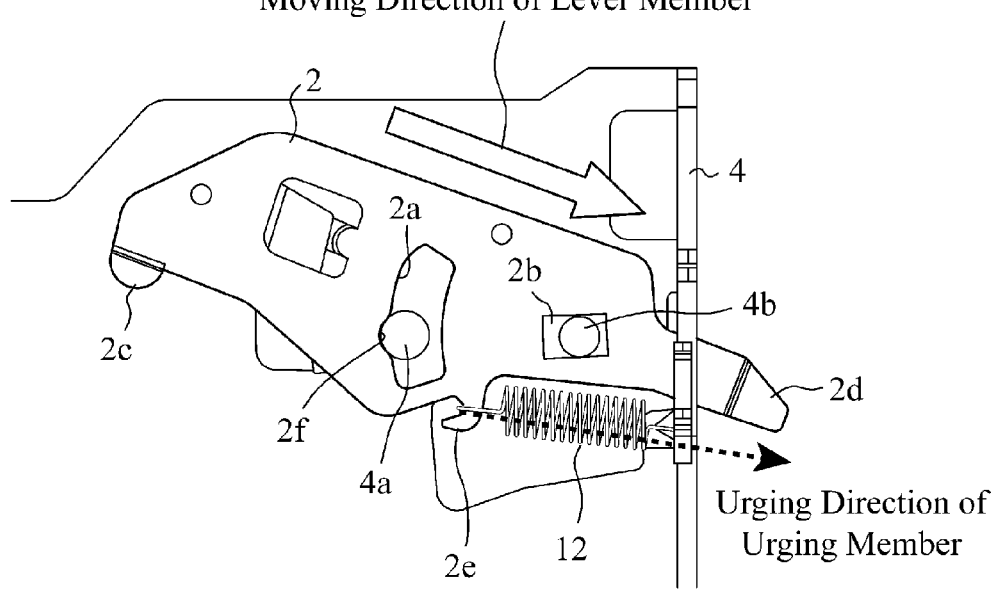
FIG. 8 is an enlarged view showing the lever member in the state shown in FIG. 6.

Further, FIG. 3, FIG. 5, and FIG. 8 are enlarged views of the lever member 2 in the working states shown in FIG. 2, FIG. 4, and FIG. 6 discussed, respectively. Moreover, FIG. 7 is a perspective view of associated members in the working state in FIG. 6.

A pin 4*a* and a boss shaft 4*b* are provided at a predetermined interval at different positions on the face (back) of the clamp member 4 opposed to the turntable. The lever member 2 is formed of a flat plate, and is a transmission member for transmitting the conveyance force of a disk to the lock member 3. The lever member 2 and the clamp member 4 have specific features of the present invention described below.

A disk-detecting end 2*c* against which the outer periphery of the carried disk 14 can abut is provided at one end of the lever member 2, and a tip portion 2*d* which can abut against the lock member 3 is provided at the other end thereof located on the side opposite from the disk-detecting end 2*c*. Further, provided through the lever member 2 are an arcuate hole 2*a* in which the pin 4*a* of the clamp member 4 is to be inserted, and also a long hole 2*b* in which the boss shaft 4*b* of the clamp member 4 is to be inserted. In this case, the long hole 2*b* is provided so as to extend in a radial direction of the arcuate hole 2*a*. On the other hand, a cutaway groove 2*f* is provided at the inner peripheral edge of the large diameter side of the arcuate hole 2*a*. Moreover, an urging member (spring) 12 is spanned between a hook 2*e* on the side of the arcuate hole 2*a* of the lever member 2 and the edge of the clamp member 4, and an urging force is to be generated substantially parallel to the long hole 2*b* such that the lever member 2 is rotated in the opposite direction to a carrying direction D of the disk about the boss shaft 4*b* as a fulcrum.

Figure 9:
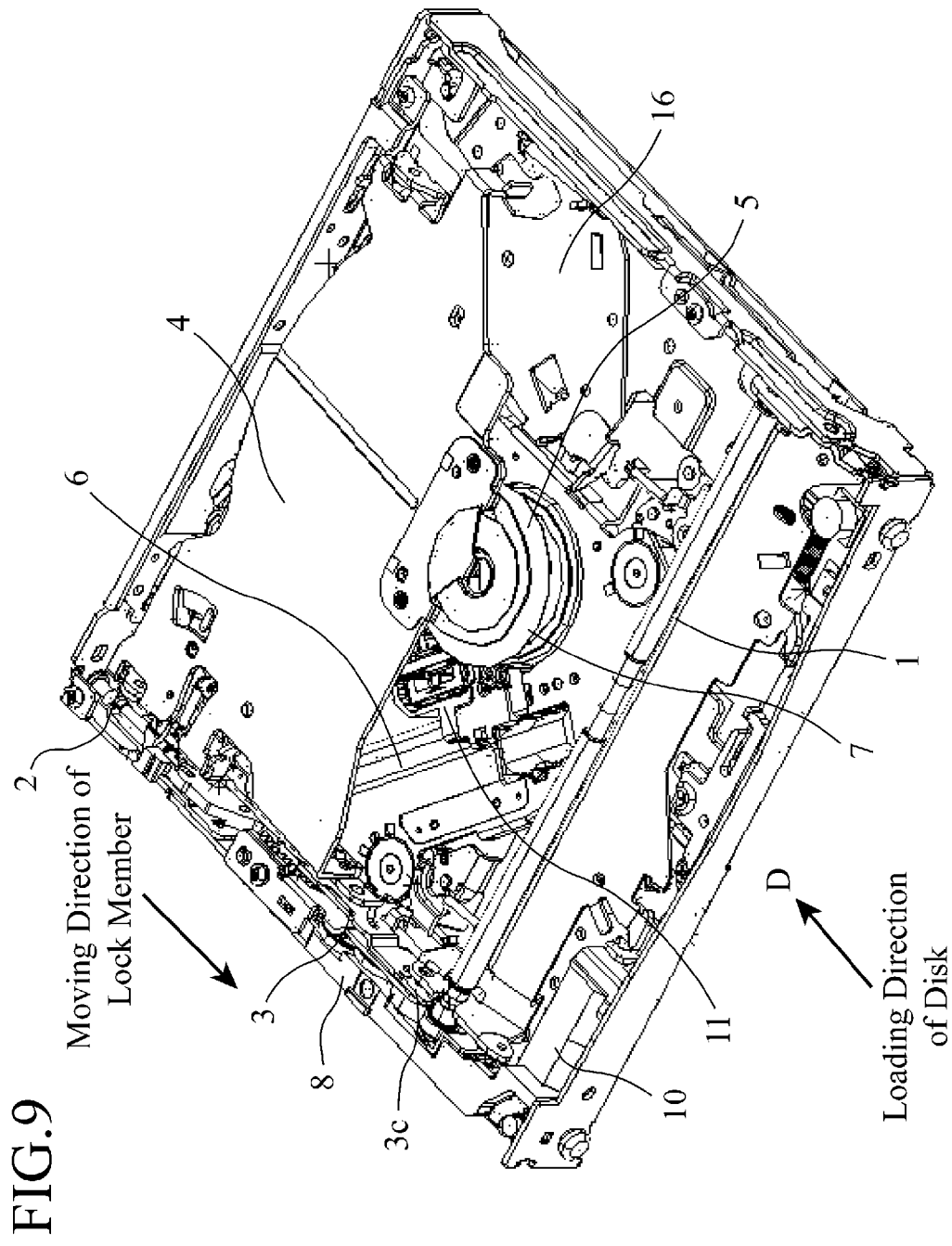
FIG. 9 is a perspective view showing the internal structure of the disk playback device.

The lock member 3 is slidably supported by a chassis base (not shown) so as to extend parallel to a carrying direction of the disk 14, and there is provided a rack section 3*b* on the side of the lock member that is not in an abutting relation with the tip portion 2*d* of the lever member 2. Furthermore, an inclined end 3*c* located at the tip of the rack section 3*b* is arranged to abut against a carrier roller 1 (FIG. 9). The rack section 3*b* is arranged to invert the rotation of a motor 10 (FIG. 9) into a rectilinear motion through a gear unit 8 (FIG. 9) including a gear 9 to perform operations for forward or backward moving the lock member 3 longitudinally.

Next, the operations of the lever member 2 and the lock member 3 in accordance with the conveyance force of the disk 14 will be described.

As shown in FIG. 2, upon carrying the disk, in the state before the outer periphery of the disk 14 abuts against the lever member 2, the lever member 2 is in a state where the lever member is rotated in a counterclockwise direction A about the boss shaft 4*b* as a fulcrum by the urging force of the urging member 12. In other words, the lever member is urged in the opposite direction to a carrying direction D of the disk 14. At this moment, the pin 4*a* abuts the one end edge of the arcuate hole 2*a* to restrain the lever member 2 against further rotation and thereby stop the disk-detecting end 2c. The urging direction or force from the urging member 12 at this moment is set at a minute level of the order at which the rotation force generated in the lever member 2 does not interfere with the conveyance force of the disk 14 to be carried. Further, the tip portion 2d located at one side of the lever member 2 is in a state abutting the lock member 3, while the rack section 3b of the lock member 3 is in a state not meshing with the gear 9 yet. An enlarged view of the lever member 2 placed in the state shown in FIG. 2 is shown in FIG. 3.

Then, when the outer periphery of the carried disk 14 abuts against the disk-detecting end 2c of the lever member 2, the lever member 2 receives the conveyance force of the disk 14 to rotate in a clockwise direction B about the boss shaft 4b as a fulcrum against the urging force of the urging member 12, and the lever member goes to a state shown in FIG. 4 and FIG. 5. At this moment, the arcuate hole 2a moves around the pin 4a such that the pin 4a relatively moves along the arcuate hole 2a. Further, the disk-detecting end 2c of the lever member 2 and the tip portion 2d thereof located on the side opposite from the disk-detecting end are rotated, and the tip portion urges the lock member 3 abutting the tip portion by the rotation force in the opposite direction to the direction where the disk 14 has been carried to be moved. When the lock member 3 is moved to a certain position before long, the rack section 3b provided on the lock member 3 begins to mesh with the gear 9 rotated by the motor. In such a way, the lock member 3 receives the drive force of the meshing gear 9 to continue to move in a longitudinal direction, and the lock member lowers the carrier roller 1, lowers the clamper 5, releases the lock state of the playback deck 6 with the inclined end 3c of the lock member 3, and urges the playback deck 6 into a floating state where the deck is supported by a dumper or the like. Consequently, vibrations from the external are intercepted to the playback deck 6, thereby achieving a vibration-free playback.

When the lock member 3 is moved off the tip portion 2d of the lever member 2, and the completely carried disk 14 is clamped against the turntable, the lever member 2 is urged by the urging member 12 to be positioned as shown in FIG. 6, FIG. 7, and FIG. 8. Specifically, as shown in FIG. 8, the lever member 2 is moved by the urging force of the urging member 12, and then the long hole 2b is guided by the boss shaft 4b of the clamp member 4, thereby the pin 4a of the clamp member 4 fits into the cutaway groove 2f provided at the middle point of the inner peripheral edge of the large diameter side of the arcuate hole 2a, and thereby the stop position of the lever member 2 during playback is determined. At this moment, the urging direction of the urging member 12 and the direction of the long hole 2b of the lever member 2 become substantially parallel to each other, and the urging member 12 can urge the lever member 2 without losing the urging force thereof. Thus, the lever member 2 does not have the backlash generated by vibrations or the like from the external.

In the above-discussed operations, when the lever member 2 is moved until the pin 4a of the clamp member 4 fits into the cutaway groove 2f, the lock member 3 is in a state that is moving by the drive force of the gear 9, and the tip portion 2d of the lever member 2 and the lock member 3 are not disposed in an abutting relation with each other any more. Thus, there is no situation such that the lock member 3 interferes with the movement of the lever member 2. Further, the lever member 2 is moved in the direction where the lever member is moved off the disk 14 being rotated with the disk clamped against the turntable; thus, there is no situation such that the lever member interferes with the rotation of the disk 14.

It is noted that the operations in the case where the disk 14 is detached from the playback deck 6 after completion of the playback are assumed to be carried out in the reverse order of the above-discussed serial operations.

As discussed above, in accordance with the first embodiment, the disk playback device includes the clamp member 4, the lever member 2, and the urging member 12. The clamp member 4 has the boss shaft 4b and the pin 4a provide at different positions on the face thereof opposed to the turntable. The lever member 2 has provided thereon the disk-detecting end 2c against which the outer periphery of the carried disk abuts; the tip portion 2d located on the side opposite from the disk-detecting end 2c and abutting against the lock member 3; the arcuate hole 2a located on the side of the disk-detecting end 2c, receiving the pin 4a inserted therein, and having the cutaway groove 2f positioned at the inner peripheral edge of the large diameter side thereof; and the long hole 2b located on the side of the tip portion 2d, receiving the boss shaft 4b inserted therein, and extending in the direction radial to the arcuate hole 2a. The urging member 12 is spanned between the lever member 2 and the clamp member 4, and is arranged to generate an urging force substantially parallel to the long hole 2b such that the lever member 2 is rotated about the boss shaft 4b as a fulcrum in the opposite direction to the carrying direction of the disk. The lever member 2 is, when the lever member has the conveyance force of the disk having abutted against the disk-detecting end 2c exerted thereon, rotated in the carrying direction of the disk against the urging force of the urging member 12, and thereby the tip portion 2d moves the lock member 3 in the direction where the lock by the lock member is released. The long hole 2b is, when the lock member 3 is moved off the tip portion 2d before long, guided by the boss shaft 4b to be moved by the urging force of the urging member 12, thereby the disk-detecting end 2c is moved off the disk clamped against the turntable, and also the pin 4a fits into the cutaway groove 2f of the arcuate hole 2a to position the lever member 2. The disk playback device is arranged as discussed above. Therefore, by simply arranging a structure in which the lever member 2, the clamp member 4, and the urging member 12 to be fundamentally used are combined to have a feature, the conveyance force of the disk is transmitted to the lock member 3 to cause the member to release the lock by the lock member, and in addition thereto the lever member 2 can be positioned (fixed) during playback. As a result, there is not required the separate provision of dedicated members for preventing the backlash of the lever member 2 caused by vibrations from the external. Thus, further thinness of the device can be achieved without increasing the number of components. Moreover, in the above-discussed example, the lever member 2 and the urging member 12 are arranged at the same level without disposing in a vertically stacking manner with each other; thus, it is possible to reduce the thickness of the product accordingly.

It should be understood that in the example, only one cutaway groove 2f is provided at the inner peripheral edge of the large diameter side of the arcuate hole 2a of the lever member 2; however, the lever member 2 can be positioned by several cutaway grooves by providing cutaway grooves at several places.

INDUSTRIAL APPLICABILITY

As discussed above, the present invention is suitable for use in vehicle-mounted disk playback devices or the equivalent, and for achieving downsizing of a disk playback device.

The invention claimed is:

1. A disk playback device that carries a disk loaded therein onto a turntable attached on a playback deck with a carrier roller to clamp the disk against the turntable with a clamp member, and that moves a lock member locking the playback deck with a lever member to unlock the playback deck, the lever member receiving the conveyance force of the carried disk to be rotated upon abutting against the outer periphery of the disk at the moment of clamping, wherein the clamp member has a boss shaft and a pin provided at different positions on a face thereof opposed to the turntable;

wherein the lever member is formed of a flat plate, and has: a disk-detecting end against which the outer periphery of the carried disk abuts; a tip portion located on the side opposite from the disk-detecting end and abutting against the lock member; an arcuate hole located on the disk-detecting end side thereof, receiving the pin inserted therein, and having a cutaway groove positioned at the inner peripheral edge of the large diameter side thereof; and a long hole located on the tip portion side thereof, receiving the boss shaft inserted therein, and extending in a direction radial to the arcuate hole;

the disk playback device further including an urging member being spanned between the lever member and the clamp member, and generating an urging force substantially parallel to the long hole to rotate the lever member about the boss shaft as a fulcrum in the opposite direction to a carrying direction of the disk; and wherein the lever member is, when the lever member has the conveyance force of the disk having abutted against the disk-detecting end exerted thereon, rotated in the carrying direction of the disk against the urging force of the urging member; thereby, the tip portion moves the lock member in the direction in which the lock by the lock member is released, the lever member is, when the lock member is moved off the tip portion before long, guided by the boss shaft inserted in the long hole to be moved by the urging force of the urging member; thereby, the disk-detecting end is moved off the disk clamped against the turntable, and also the pin fits into the cutaway groove of the arcuate hole to position the lever member.

2. The disk playback device according to claim 1, including a structure in which the components are interchanged in the positions such that the arcuate hole and the long hole are provided on the clamp member side and that the boss shaft and the pin are provided on the lever member side.

* * * * *